Figure 1:
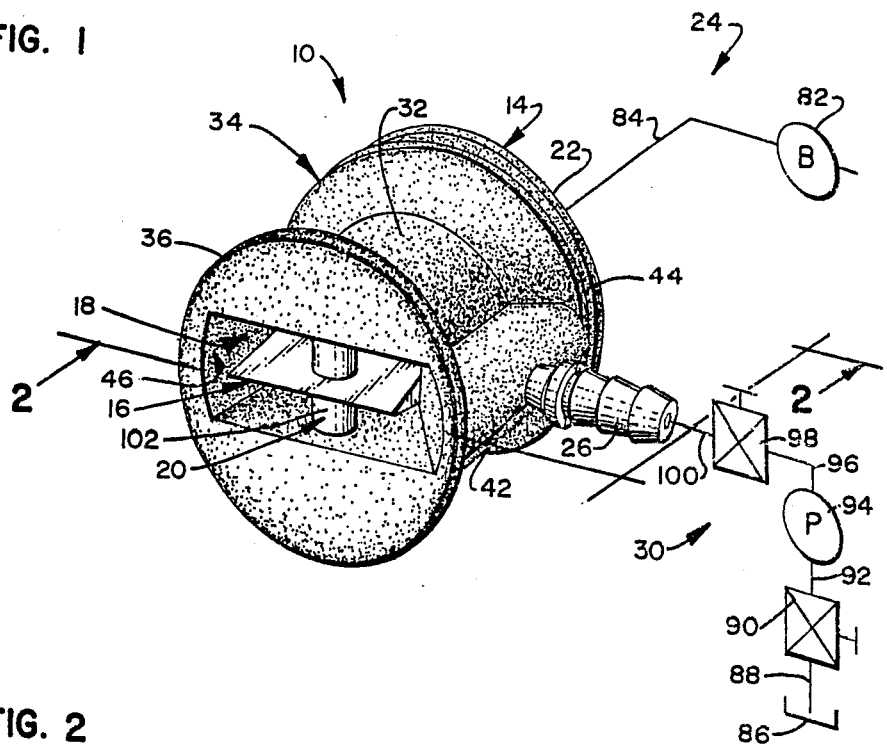

United States Patent [19]

Hanson

[11] Patent Number: 4,749,129

[45] Date of Patent: Jun. 7, 1988

[54] DEVICE FOR ATOMIZING A LIQUID

[75] Inventor: Glen E. Hanson, Sioux Falls, S. Dak.

[73] Assignee: D & W Industries, Inc., Sioux Falls, S. Dak.

[21] Appl. No.: 825,213

[22] Filed: Feb. 3, 1986

[51] Int. Cl.⁴ .............................................. B05B 7/04
[52] U.S. Cl. ..................................... 239/432; 239/77; 261/78.2; 261/79.1
[58] Field of Search ................... 239/8, 343, 461, 504, 239/505, 590.5, 434, 500, 502, 432, 77, DIG. 7, 159; 261/78 A, 78 R, 79

[56] References Cited

U.S. PATENT DOCUMENTS

| | | | |
|---|---|---|---|
| 736,664 | 8/1903 | Williams | 239/432 X |
| 968,252 | 8/1910 | Moore | 239/432 |
| 970,382 | 9/1910 | Mammethey | 239/432 |
| 1,596,577 | 8/1926 | Burns | 239/432 X |
| 2,551,538 | 5/1951 | Hensel . | |
| 2,770,501 | 11/1956 | Coanda | 239/DIG. 7 X |
| 2,907,557 | 10/1959 | Coanda | 239/DIG. 7 X |
| 3,285,522 | 11/1966 | Salisbury | 261/78 A |
| 4,330,086 | 5/1982 | Nysted | 239/432 X |
| 4,504,014 | 3/1985 | Leuning | 239/DIG. 7 X |

FOREIGN PATENT DOCUMENTS 676966 8/1952 United Kingdom .

OTHER PUBLICATIONS

Brochure: "*Farm Journal*®"; Jan. 1984.
Brochure: "*Spray Foil*" Field Sprayer; by D & W Construction, Inc.

Primary Examiner—Andres Kashnikow
Assistant Examiner—Kevin Patrick Weldon
Attorney, Agent, or Firm—Merchant, Gould, Smith, Edell, Welter & Schmidt

[57] ABSTRACT

A device for atomizing a liquid is disclosed. The device is mounted to a frame and is plumbed for fluid communication with an air source and a liquid source. The device includes a grommet with a passage therein for receiving a substantially symmetrical foil. The foil includes a flow dividing mechanism for aiding in mixing the air and liquid fluids.

6 Claims, 2 Drawing Sheets

DEVICE FOR ATOMIZING A LIQUID

TECHNICAL FIELD

This invention relates to spraying equipment and, more particularly, to that part of a sprayer which ejects and atomizes a stream of liquid.

BACKGROUND OF THE INVENTION

For crops having heavy foliage, such as potatoes, tomatoes, sugar beets, beans, cabbage, broccoli, cotton, etc., it is commonly advisable to spray chemicals for the control of insects, diseases and weeds in such a way that the chemicals reach the underside of the leaves. This is a difficult problem for most sprayer designs. U.S. Pat. No. 2,770,501 discloses a mechanism which when used on a sprayer accomplishes coverage on the underside or leaves. The mechanism, however, has been inefficient and, consequently, not widely accepted.

U.S. Pat. No. 2,770,501 discloses use of a wing placed in a conduit through which air is forced. Oppositely, directed streams of liquid chemical are ejected into a triangular opening extending from top to bottom through the central part of the wing. The base portion of the triangular opening forms the leading edge of a second wing profile which extends rearwardly to conform to the profile of the larger primary wing profile. Although chemical trails rearwardly along the upper and lower surfaces of the wing, large droplets or amounts of chemical drop onto the ground in a stream and are not properly utilized.

U.S. Pat. No. 4,504,014 was directed to improving the spray pattern of this type of spray head. The wing was altered to have a rectangular opening, instead of a triangular opening and the grommet was given certain nozzle characteristics. These improvements helped decrease emission of large droplets or amounts of chemical being ejected. It has been found, however, that chemical continued to stream. Consequently, in the case of herbicides, a sprayed field tended to have rows where weeds had been killed and spaces between the rows where weeds continued to thrive.

The present invention further improves the devices of U.S. Pat. Nos. 2,770,501 and 4,504,014.

SUMMARY OF THE INVENTION

The present invention is directed to a device for atomizing a liquid. The device is mounted on a frame. The device is in communication through first communication mechanism with a pressurized gaseous fluid source and through a second communication mechanism with a pressurized liquid fluid source. The device includes a grommet attached to the frame. The grommet has a passage through it with one end of the passage in fluid communication with the first communication mechanism. The passage has first and second opposite sides. The device further includes a wing with a substantially symmetrical profile. The wing includes a mechanism for injecting across a portion of the profile liquid fluid from the second communication mechanism. The device also includes a mechanism attached to the wing for dividing flow of the gaseous and liquid fluid mixture along the wing profile. The dividing mechanism extends generally perpendicularly from the wing to near the opposite sides of the passage in the grommet. The device also has a mechanism for attaching the wing within the passage of the grommet.

With a device in accordance with the invention, said gaseous fluid flows through the passage in the grommet and across the wing. Liquid fluid mixes with the gaseous fluid where the injecting mechanism introduces the liquid fluid to the flow of the gaseous fluid across the wing. The dividing mechanism separates the flow of the gaseous and liquid fluid mixture in order to better mix the gaseous and liquid fluids thereby minimizing ejection of a stream of liquid fluid.

In another embodiment, the dividing mechanism is formed by a cylindrical post which passes through the wing. Preferably, the post extends from the surfaces of the wing on both sides of the wing to near the opposite sides of the passage in the grommet. The post is located near the center of the wing and, consequently, as the air and liquid mixture flow along the wing, the flow is divided and becomes turbulent. The liquid mixes with the air to a much greater extent than is otherwise the case, and a wide distribution of small liquid particles results. This contrasts with the much more narrow stream-like ejection of liquid when the post or other dividing mechanism is not present.

The present device, thus, is vastly more appropriate for use with agricultural implements and the spraying of agricultural fields with insecticides and herbicides.

These various advantages of the present invention are further explained by reference to the following drawings and the detailed description of a preferred embodiment given thereafter.

BRIEF DESCRIPTION OF THE DRAWINGS

FIG. 1 a perspective view of a device in accordance with the invention;

FIG. 2 a cross-sectional view taken generally along line 2—2 of FIG. 1;

FIG. 3 is a photograph of water-sensitive paper showing the spray pattern of a prior art device;

FIG. 4 is a photograph of water-sensitive paper showing the spray pattern of a device in accordance with the present invention; and FIG. 5 is a perspective view of an agricultural implement sprayer having booms holding devices in accordance with the present invention.

DETAILED DESCRIPTION OF THE PREFERRED EMBODIMENT

Referring now to the drawings, wherein like reference numerals designate identical or corresponding parts throughout the several views and, more particularly, to FIG. 1, a device for atomizing a liquid in accordance with the present invention is designated generally by the numeral 10. Atomizing device 10 is commonly used on an agricultural implement sprayer 12, such as that shown in FIG. 5, but may be used in a variety of other applications as well wherein it is necessary to atomize a stream of liquid while ejecting it in combination with air or some other gaseous fluid.

Atomizing device 10 includes a grommet 14 having a foil 16 attached within a passage 18 of grommet 14. A flow dividing mechanism 20, shown in the form of a cylindrical post 102, is attached to foil 16. A gaseous fluid is supplied to the receiving end 22 of passage 18 of grommet 14 by first fluid communication mechanism 24. A liquid fluid is supplied to metering pin 26 fitted into a passage 28 of grommet 14 via second fluid communication mechanism 30. Metering pin 26 is in fluid communication with opening 66 in foil 16.

Figure 2:
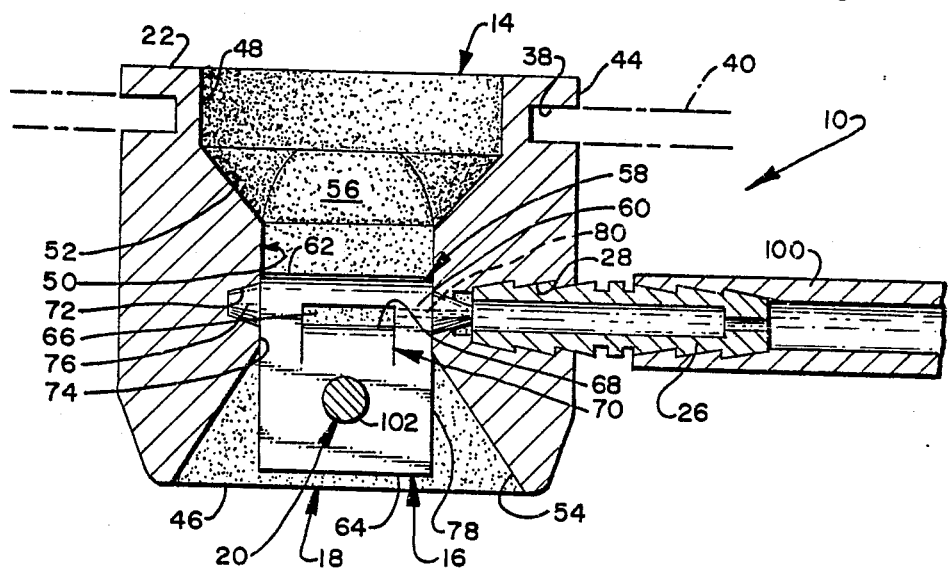
Figure 5:
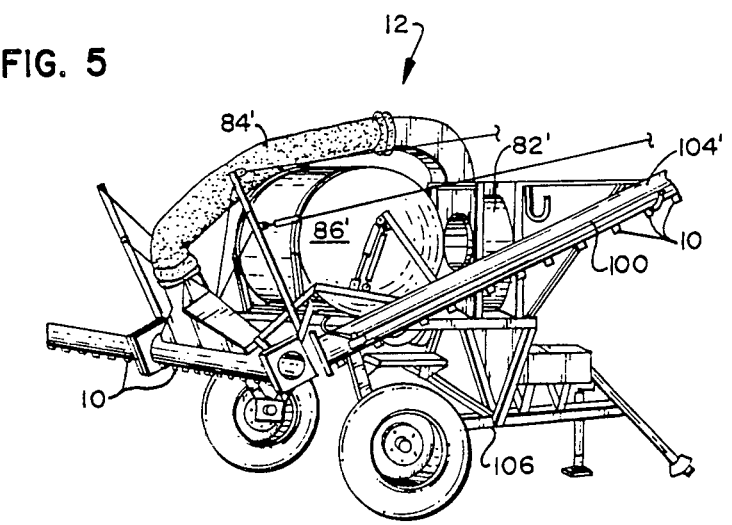

As shown in FIGS. 1 and 2, grommet 14 has a generally cylindrical central portion 32 with cone-like rearward and forward portions 34 and 36. The outer portion of rearward cone 34 includes a groove 38 for receiving a wall 40, which may be a part of a frame or as shown in FIG. 5, part of boom 104. A ridge 42 extends between rearward and forward cone-like portions 34 and 36. Ridge 42 is generally centered on a radial plane passing through the axis of cylindrical central portion 32. Ridge 42 provides structure for receiving metering pin 26. Preferably, grommet 14 is made from a rubber material, although other materials may be used as well as long as provision is made for attaching grommet 14 to a frame, as represented by wall 40, and as long as provision is made for receiving and holding foil 16 in passage 18. If grommet 14 is made from a relatively flexible rubber, the outer ring 44 of rearward cone portion 34 may be deformed in order to fit frame 40 into groove 38.

Passage 18 proceeds through grommet 14 from the receiving or rear end 22 to the projecting or front end 46. Passage 18 is cylindrical at receiving end 22 to approximately or just beyond the plane of the forwardmost wall of groove 38. The central portion 50 of passage 18 has a rectangular cross section. A conical portion 52 connects cylindrical portion 48 and central portion 50. Similarly, a partially conical portion 54 proceeds from central portion 52 to projecting end 46. Central portion 50 has opposite sides 55 facing first and second surfaces 60 and 71 of foil 16. Sides 55 extend to projecting end 46. Partially conical portion 54 comprises then a pair of separated surfaces 57 expanding conically outwardly from sides 77 of central portion 50, surfaces 57 being separated from one another by sides 55. Flat, semi-elliptical surfaces 56 opposite from one another are formed in the conical wall of conical portions 52 and 54. Flat surfaces 56 are oriented so as to intersect both parallel to and perpendicular to the central plane of foil 16 in conical portion 52 and so as to intersect perpendicular to the central plane of foil 16 in conical portion 54.

Foil 16 is formed in the shape of a substantially symmetrical first wing 58. First wing 58 has first upper and lower surfaces 60 (the lower surface not shown). First wing 58 has a leading edge 62 and a trailing edge 64. First wing 58 further has an opening 66 extending completely through it from one first surface 60 to the other first surface 60. Opening 66 is shown to be rectangular, but may be triangular or some other shape as well. Opening 66 has a side which forms a second leading edge 68 for a second wing 70. Second wing 70 is also substantially symmetrical and extends from second leading edge 68 and has second upper and lower surfaces 71 which meet and conform with the first upper and lower surfaces of first wing 58.

Grommet 14 includes a frusto-conical cavity 72 in each of opposite walls 57 of central portion 50 of passage 18 for receiving similarly shaped protuberances 76 attached to the opposite side walls 78 of foil 16. If grommet 14 is made from a relatively flexible rubber material, as preferred, during assembly it may be compressed somewhat so that foil 16 may be inserted into passage 18 and protuberances 76 slid along side walls 57 before popping into cavities 72.

A passage 80 is formed in foil 16 leading from opening 66 to passage 28 in grommet 14. Passage 80 is preferably centered in protuberance 76. Passage 80 is in fluid communication through passage 28 and metering pin 26 with communication mechanism 30.

First communication mechanism 24 provides pressurized air to receiving end 22 of grommet 14 for flowing through passage 18 and about foil 16. Air is received by blower 82 and directed through one or more tubes or containing enclosures 84 to receiving end 22. The air is then forced to compress further, as with a venturi, to flow through central portion 50 and about foil 16.

Second communication mechanism 30 includes a tank or reservoir 86. Liquid fluid is drawn from pipe 88 through a valve 90 and another pipe 92 to pump 94. Pump 94 forces the liquid through tube 96 and valve 98 into tube 100 connected to metering pin 26. The liquid passes through metering pin 26 and passages 28 and 80 into opening 66. As the liquid is ejected into opening 66, it is aspirated into and becomes entrained in the air flowing over foil 16.

Dividing mechanism 20 divides the flow of the air and liquid mixture and causes a turbulence which more completely mixes the liquid with the air to create finer liquid droplets. Dividing mechanism 20 in the preferred embodiment is a cylindrical post 102. Post 102 is oriented perpendicularly to the central plane of foil 16 and extends through foil 16 from the lower to the upper surface of either first or second wing 58 and 70. Post 102 extends from the indicated upper and lower surfaces to a location preferably almost in contact with the opposite sides 55 of passage 18. As mentioned, although it is preferable for post 102 to extend near sides 55, it must extend at least one-half the distance from foil 16 to each of sides 55. In addition, although a post is preferred as the dividing mechanism, it is recognized that other structural shapes may be used to create the necessary flow division and turbulence for mixing the liquid and gaseous fluids. The dividing mechanism simply needs a surface, which may be only a line as would be the case for a wedge-type shape, which is perpendicular to the center plane of the foil and extends between the foil and to or at least one half the way to the opposite sides 55 of passage 18.

A typical application for a device 10 is shown in FIG. 5 with respect to an implement 12. Devices 10 are installed along a boom 104 mounted on the wheeled implement frame 106. The boom 104 is a hollow tube which carries air from blower 82' and tubes 84'. As depicted in FIGS. 1 and 2, the air flows from boom 104 into the receiving end 22 of the various grommets. The plumbing for delivering liquid fluid from tank 86' is not shown in FIG. 5, but it is generally represented by the representative type of plumbing circuit illustrated in FIG. 1.

In use, grommets 14 are assembled to a frame which places the receiving end 22 of each grommet in fluid communication with a pressurized air source. A hose 100 or similar mechanism is also appropriately connected to grommet 14, as through metering pin 26, so as to provide fluid communication of liquid from a tank 86 to passage 80 and opening 66 in foil 16. The liquid ejected into opening 66 is aspirated in both directions into the air flowing about foil 16. As the air and liquid mixture flow along foil 16, it impacts post 102 or other dividing mechanism which functions to break up the liquid stream into small particles and mix those particles relatively uniformly throughout the air flow.

Figure 3:
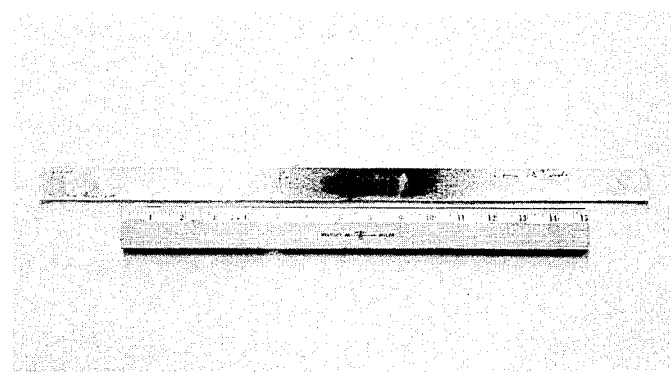
Figure 4:
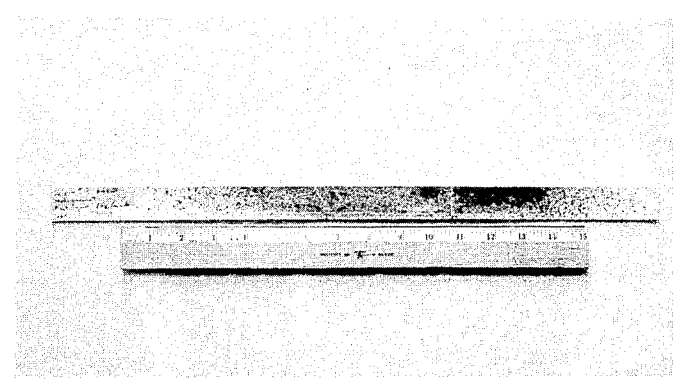

When a device 10 is moved over the ground about 15 inches off the ground, a typical droplet pattern at the ground is shown in FIG. 4. In contrast, a typical liquid pattern for a device not having a dividing mechanism 20 attached to foil 16 is shown in FIG. 3. The pattern of FIG. 3 is stream-like and leads to selective rows of liquid coverage as in the prior art. The pattern of FIG. 4 is much more uniform in coverage, and if devices 10 are spaced-apart eight inches on, for example, a boom 104 on an implement 12, the uniform liquid coverage is obtained along the entire length of ground beneath the boom. It has been found that at least 35 dots per square centimeter are received on liquid sensitive paper of the type shown in FIG. 4 along the length beneath a boom when devices 10 are spaced-apart approximately eight inches and when the projecting end 46 is approximately 15 inches off the ground. Such a configuration results in a usage ratio of approximately one-half gallon of liquid per acre, a usage level which is remarkable and represents a considerable savings over known sprayer devices.

Some of the possible variations in device 10 have been indicated. Other variations may include moving the post 102 or other dividing mechanism 20 nearer or farther from opening 66. Also, the effective width of post 102 or mechanism 20 may be reduced or enlarged depending on the velocity of air flow and the location of post 102 relative to opening 66. Since post 102 creates a turbulence, foil 16 need not come to a sharp trailing edge 64, but may be truncated.

In addition, still other variations and alterations may provide equivalent structure and results. Thus, although the advantages and details of structure and function of the preferred embodiment of the present invention have been set forth at length, they are understood to be exemplary. Any changes made, therefore, especially in matters of shape, size and arrangement of parts, as well as the types of plumbing circuits and numbers of components, to the full extent extended by the general meaning of the terms in which the appended claims are expressed, are within the principle of the invention.

What is claimed is:

1. A device for atomizing a liquid, said device being mounted on a frame, said device being in communication through first communication means with a pressurized gaseous fluid source, said device being in communication through second communication means with a pressurized liquid fluid source, said device comprising:
  - a grommet attached to said frame, said grommet having a passage therethrough with one end of said passage in fluid communication with said first communication means, said passage having first and second opposite sides;
  - a wing with a substantially symmetrical profile, said wing including means for injecting across a portion of said profile liquid fluid from said second communication means;
  - means, attached to said wing, for dividing flow of said fluids along said wing profile, said dividing means extending from said wing to near said opposite sides of said passage in said grommet; and
  - means for attaching said wing within said passage of said grommet;
  - whereby said gaseous fluid flows through said passage in said grommet and across said wing, said liquid fluid mixing with said gaseous fluid where said injecting means introduces said liquid fluid to the flow of said gaseous fluid, said dividing means separating the flow of said fluids with respect to said wing to better mix said gaseous and liquid fluids to minimize the likelihood of ejection of a stream of liquid fluid from said passage in said grommet.

2. Apparatus in accordance with claim 1 wherein said dividing means includes a cylindrical post.

3. A device for atomizing a liquid, said device being mounted on a frame, said device being in communication through first communication means with a pressurized gaseous fluid source, said device being in communication through second communication means with a pressurized liquid fluid source, said device comprising:
  - a grommet attached to said frame, said grommet having a passage therethrough with one end of said passage in fluid communication with said first communication means;
  - a wing including means for injecting said liquid fluid into said gaseous fluid flowing across said wing, said wing further including means for dividing the flow of said fluids with respect to flowing along said wing, said passage in said grommet in regions above and below said wing having flat, substantially parallel sides, said dividing means extending at least one half the distance from said wing to each of said sides;
  - means for attaching said wing within said passage to said grommet; and
  - means for directing said liquid fluid from said second commucations means to said injecting means.

4. A device for atomizing a liquid, said device being mounted on a boom supported on a frame of an agricultural implement, said device being in fluid communication through first communication means with an air blower, said device also being in communication through second communication means with a tank having liquid therein, said second communication means including a pump, said device comprising:
  - a grommet attached to said boom, said grommet having a passage therethrough with one end of said passage being in fluid communication with said first communication means;
  - an air foil in the shape of a wing, said foil having a first upper surface and a first lower surface, said foil also having first leading and first trailing edges, said foil further having an opening extending therethrough from said first lower surface to said first upper surface, said opening having a side forming a second leading edge for a second wing, said second wing having a second upper surface and a second lower surface, said second wing extending from said second leading edge to meet and conform to the first upper and lower surfaces of said first wing;
  - said passage in said grommet having first opposite sides with regions opposite said foil having flat surfaces which are substantially parallel with one another, said passage also having second opposite sides flaring away from one another to form an ever-expanding nozzle;
  - means for attaching said foil within said passage to said grommet;
  - means for directing said liquid from said second communication means into said opening in said foil to mix with the air and flow along said foil; and
  - means for dividing said air and liquid mixture flowing along said foil, said dividing means extending from one of said first and second upper surfaces of said foil to near one of said flat first surfaces of said passage, said dividing means also extending from one of said first and second lower surfaces of said foil to near the other of said flat first surfaces of said passage.

5. A device in accordance with claim 4 wherein said dividing means includes a cylindrical post, said foil being symmetrical about a center plane, said post extending through said foil perpendicular to said center plane.

6. A device in accordance with claim 4 wherein said foil is substantially symmetrical about a center plane and said dividing means includes a surface facing oncoming air and liquid flow, said surface being perpendicular to said center plane, said facing surface extending between said foil and the opposite flat surfaces of said passage.

* * * * *